United States Patent [19]

f'Geppert

[11] 4,403,521
[45] Sep. 13, 1983

[54] CONTINUOUS SHAFT SEAL

[75] Inventor: Erwin f'Geppert, Oakland, Mich.

[73] Assignee: The United States of America as represented by the Secretary of the Army, Washington, D.C.

[21] Appl. No.: 277,457

[22] Filed: Jun. 26, 1981

[51] Int. Cl.³ .............................................. F16J 15/50
[52] U.S. Cl. ..................................... 74/17.8; 74/18.1
[58] Field of Search ........................... 74/17.8, 18, 18.1

[56] References Cited

U.S. PATENT DOCUMENTS

| Re. 30,334 | 7/1980 | Coles | 74/18.1 |
| 2,119,955 | 6/1938 | Litton | 74/18.1 X |
| 2,545,562 | 3/1951 | Thiel | 74/17.8 |
| 3,049,931 | 8/1962 | Lang et al. | 74/18.1 X |

Primary Examiner—Ernest R. Purser
Attorney, Agent, or Firm—Peter A. Taucher; John E. McRae; Robert P. Gibson

[57] ABSTRACT

A sealing device for sealing the joint between a through shaft and a wall or partition. The sealing device is comprised of a relatively thin, flexible diaphragm sandwiched between nonrotatable pressure plates which are floatably positioned between two inclined cam elements. The cam elements are carried by two axially aligned rotatable shafts. When one of the shafts is rotated, the cam elements will force the other shaft to rotate. The intervening pressure plates do not rotate but merely wobble when the shafts are torqued. The sealing diaphragm, being interposed between the pressure plates, completely seals the opening of entry of the shafts from one another.

1 Claim, 1 Drawing Figure

U.S. Patent  Sep. 13, 1983  4,403,521
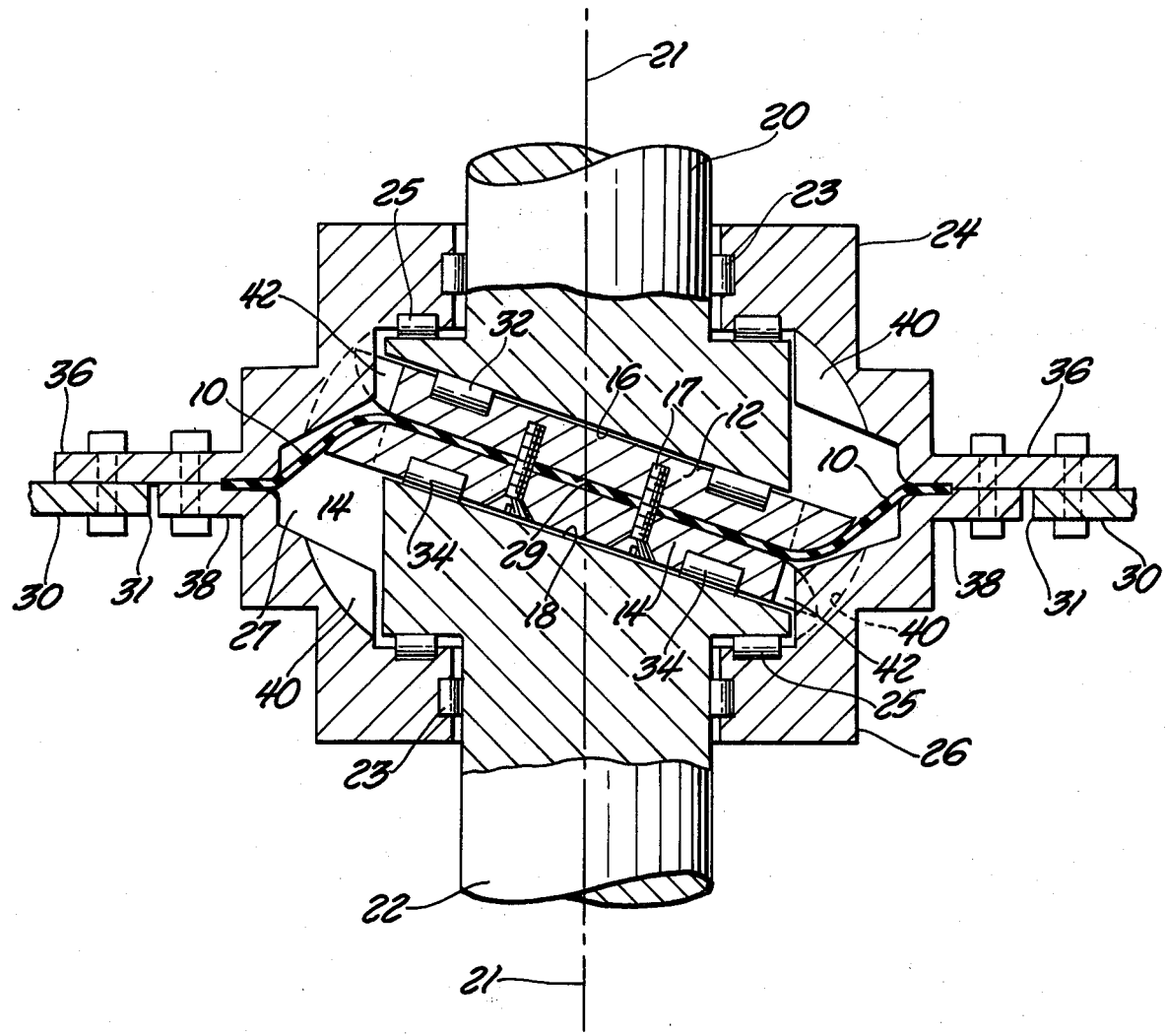

CONTINUOUS SHAFT SEAL

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to improvements in sealing elements designed for use at the joint between a rotating through shaft and a fixed wall or partition. The sealing device has particular application in military vehicle compartments, where it may be necessary to exclude external noxious or toxic chemicals from the interior personnel compartment. It is known to provide moving seals to seal the opening in a partition through which a rotational shaft is passed. The moving shaft tends to produce heat and frictional wear as it rotates against the sealing device. The heat created by the friction tends to degrade the elastomers and polymers in the seal so that the seal tends to shrink, harden and crack, thereby compromising the integrity of the seal. Thus, the seal has to be replaced periodically if proper sealing action is to be maintained.

The present invention differs from the prior art in that it is not a moving seal in the strict sense of the term. Rather, it is stationary in relation to both the shaft and partition; the seal does not rotate against the shaft or the partition to be sealed. The problem of shrinkage due to loss of elastomers and polymers occasioned by frictional heat is eliminated. The seal provides continuous constant sealing action.

The contemplated sealing mechanism is a continuous flexible diaphragm or membrane suitably clamped to a pair of pressure plates that are floatably positioned between two cam elements carried by separate axially aligned shafts or shaft sections. The shafts extend through separate housing plates which are clamped together to form a housing structure that closes the opening in the wall or partition. The action of the sealing diaphragm is such that when either shaft is torqued, its cam element rotates the other shaft. The floatably-positioned pressure plates wobble around the shaft axis at a rate proportional to the shaft rotational speed.

The advantage the described sealing mechanism has over the prior art is that the sealing diaphragm provides a continuous, uninterrupted seal that should not ever leak or require replacement due to wear, as occurs with moving seals. The present invention is thus suitable for sealing the personnel compartment of a military vehicle from external toxic substances.

THE DRAWINGS

The single FIGURE is a longitudinal cross-sectional view of a shaft seal mechanism embodying this invention. The mechanism is designed to seal the opening 31 in any partition wall 30 through which pass separate axially aligned rotational shafts 20 and 22. As seen in FIG. 1, two axially aligned rotary shafts 20 and 22 pass through one housing plate each, rotary shaft 20 passing through housing plate 24 and rotary shaft 22 passing through housing plate 26. Note that housing plate 24 is equipped with a relatively large peripheral flange 36 which is affixed or clamped in any suitable manner to partition wall 30. Wall 26 is provided with a peripheral flange 38 for clamping walls 24 and 26 together. Each shaft 20 or 22 may be supported in the defined housing 27 by means of radial bearings 23 and thrust bearings 25. Rotational shafts 20 and 22 are equipped with enlarged ends having end faces 16 and 18 that are acutely angled to the shaft axis 21.

The space between angled end faces 16 and 18 is occupied by an assembly that comprises pressure plates 12 and 14, and flexible diaphragm 10; screws 17 can be used to secure the diaphragm to the pressure plates. The peripheral edge of the diaphragm is clamped between plates 36 and 38. Each plate 12 or 14 carries a ring of antifriction rollers or ball 32 or 34 to minimize unwanted friction and wear between plates 12, 14 and shaft end faces 16, 18.

It is intended that diaphragm 10 and associated pressure plates 12 and 14 will have a three-dimensional wobbling motion around an imaginary center point 29 at the intersection of shaft axis 21 and the general plane of the diaphragm. The diaphragm-pressure plate assembly wobbles about center point 29 with a rolling motion, but without bodily rotation; the peripheral edge of the diaphragm is clamped in a fixed position by housing plates 36 and 38. The pressure plates 36 and 38 have slots 42 on their peripheral edges which interengage with projections on the housing structure to prevent rotational stress on diaphragm 10.

Shafts 20 and 22 are similarly constructed; shaft 20 can drive shaft 22, or vice versa. Assuming that shaft 20 is the drive shaft and shaft 22 is the driven shaft, the inclined end face 16 of rotating shaft 20 will transmit axial and rotational forces to rollers 32 carried by pressure plate 12. Rollers 34 on plate 14 will transmit the axial and rotational forces to inclined end face 18 of shaft 22; the two shafts 20 and 22 will rotate around axis 21 at the same rotational rate. Plates 12 and 14 will wobble around point 29 but will not rotate. Thrust bearings 25 absorb the axial forces that would otherwise tend to produce axial separation of shaft 22 from shaft 20. Plates 12 and 14 are flat plates constructed so that rollers 32 and 34 lie in parallel planes acutely angled to the shaft axis 21; shaft end faces 16 and 18 act as cam surfaces.

The rotational torque transfer action can be visualized as though the assembly of diaphragm 10 and plates 12, 14 were eliminated, and shafts 20 and 22 were lengthened so that cam surfaces 16 and 18 were in direct contact with each other. With such an arrangement, it is clear that shafts 20 and 22 would rotate in unison with one another. The interposition of the diaphragm-pressure plate assembly between surfaces 16 and 18 does not change the force-transfer relation, except that the diaphragm-pressure plate assembly is required to undergo a wobbling motion in accordance with the movement of surfaces 16 and 18 around shaft axis 21.

Flexible diaphragm 10 is a continuous membrane extending entirely through the shaft assembly. The membrane acts as a continuous seal across the shaft-housing interface; there is no frictional rubbing force such as is present with conventional moving seals. The diaphragm should have enough excess material within the housing structure 25 to allow the pressure plates 12, 14 to wobble when the shafts are rotated without compromising the diaphragm integrity. Note that should either shaft be torqued, its cam element surface 16 or 18 will produce rotation of the other cam element surface 18 or 16 and its associated shaft.

The angularity of cam surfaces 16 and 18 relative to shaft axis 21 is a compromise between the radial and axial forces to be absorbed by the shaft berarings 23 and 25. As cam surfaces 16 and 18 approach a radial plane the thrust loads become more of a problem; as cam surfaces 16 and 18 are designed with greater angularity and lessened radial component then the radial side loadings pose a greater problem. Selection of an appropriate cam surface angle is at least partially dictated by the installation in which the sealing system is to be used.

The flexible sealing diaphragm may be constructed of any impermeable material such as rubber, leather, etc., which would exclude external toxic substances from passing through the opening 31 in partition wall 30. The advantage of the described sealing mechanism is that it would provide a continuous, uninterrupted seal that would not ever leak or require replacement due to wear, shrinkage or hardening as occurs with conventional rub-type seals.

I wish it to be understood that I do not desire to be limited to the exact details of construction shown and described for obvious modifications will occur to a person skilled in the art.

I claim:

1. In a system that includes a partition (30) having an opening (31) therethrough: the improvement comprising a first housing structure (24) having a first peripheral flange (36) adapted to overlap and be secured to face areas of the partition that define the aforementioned opening; a second housing structure (26) having a second peripheral flange (38) clamped to the peripheral flange on said first housing structure, said peripheral flange on the second housing structure having a lesser radial dimension than said opening for disposition therein without contacting the partition; a continuous flexible sealing diaphragm 10 located within the space circumscribed by the housing structures, said diaphragm having a peripheral edge area thereof clamped between the housing structure peripheral flanges to seal the defined peripheral joint; a first pressure plate (12) positioned on one face of the diaphragm; a second pressure plate (14) positioned on the other face of the diaphragm; means (17) securing the pressure plates to the diaphragm; a first rotary shaft (20) extending into the first housing structure, said first shaft having an interior end face (16) acutely angled to the shaft axis to form a first cam surface; first anti-friction rollers (32) interposed between said cam surface and the first pressure plate; a second rotary shaft (22) extending into the second housing structure in axial alignment with the first shaft, said second shaft having an interior end face (18) acutely angled to the shaft axis at the same angle as said first mentioned end face, said last-mentioned end face constituting a second cam surface; second anti-friction rollers (34) interposed between said second cam face and the second pressure plate; thrust bearings (25) in each housing structure for absorbing thrust loads transmitted from one cam surface to the other cam surface through the pressure plates; radial bearings (23) in each housing structure for absorbing radial loads associated with rotational movements of the respective shafts; said diaphragm having a peripheral slack area between the outer edges of the pressure plates and the clamped peripheral edge areas of the diaphragm, whereby the diaphragm-pressure plate assembly can undergo a wobble motion around the intersection point of the diaphragm and the shaft axis; and means for preventing rotational stress on the diaphragm; said stress-prevention means comprising two diammetrically-disposed internal slots (40) in each housing structure, and two diammetrically-disposed projections (42) extending from each pressure plate into different ones of the slots; said housing structures being clamped together to confine the shafts and sealing diaphragm in a unitary assembly installable on the partition by suitable positionment of said first peripheral flange on a face area of the partition.

* * * * *